United States Patent [19]

Kurosu et al.

[11] Patent Number: 4,543,631
[45] Date of Patent: Sep. 24, 1985

[54] JAPANESE TEXT INPUTTING SYSTEM HAVING INTERACTIVE MNEUMONIC MODE AND DISPLAY CHOICE MODE

[75] Inventors: Masaaki Kurosu, Chofu; Takeshi Nakayama, Tokyo; Akira Nakajima, Tokyo; Yoshimitsu Ohshima, Tokyo, all of Japan

[73] Assignee: Hitachi, Ltd., Tokyo, Japan

[21] Appl. No.: 304,611

[22] Filed: Sep. 22, 1981

[30] Foreign Application Priority Data

Sep. 22, 1980 [JP] Japan .................. 55-130719

[51] Int. Cl.⁴ .................. G06F 3/02; G06F 3/14; G06F 15/38
[52] U.S. Cl. .................. 364/200; 364/419; 400/110; 340/711; 434/157; 434/167
[58] Field of Search ... 364/200 MS File, 900 MS File, 364/419, 518; 400/73, 110, 121; 381/36, 41, 49, 42–44; 340/711, 721; 434/157–160, 167

[56] References Cited

U.S. PATENT DOCUMENTS

| | | | |
|---|---|---|---|
| 4,051,606 | 10/1977 | Tozo | 400/86 |
| 4,270,022 | 5/1981 | Loh | 178/30 |
| 4,286,329 | 8/1981 | Goertzel et al. | 364/900 |
| 4,327,421 | 4/1982 | Wang | 364/900 |
| 4,365,235 | 12/1982 | Greanias et al. | 340/146.3 AC |
| 4,408,199 | 10/1983 | White et al. | 340/731 |
| 4,481,508 | 11/1984 | Kamei et al. | 340/712 |
| 4,498,143 | 2/1985 | Strzelecki | 364/900 |

FOREIGN PATENT DOCUMENTS

| | | | |
|---|---|---|---|
| 45527 | 4/1979 | Japan | 340/711 |
| 105432 | 8/1979 | Japan | 340/711 |
| 124935 | 9/1979 | Japan | 340/711 |
| AN52757 | 4/1980 | Japan | 340/711 |
| AN64276 | 5/1980 | Japan | 340/711 |
| 2,033,633 | 5/1980 | United Kingdom | 340/720 |
| 2116341 | 9/1983 | United Kingdom | 400/110 |
| 2118749 | 11/1983 | United Kingdom | 400/110 |

OTHER PUBLICATIONS

Global Integration Technologies, Chinese Language Intelligent Terminal, (G.I.T., Inc., 1981), pp. 1–5.
D. J. Abramson et al., Direct Entry of Kanji from an Alphanumeric Keyboard, IBM Tech. Disclos. Bull., (vol. 26, No. 12, May 1984).
D. J. Abramson et al., User-Defined Data Keys; and Automatic Mode Select on the IBM Kanji Keyboard, IBM Tech. Disclos. Bull., (vol. 26, No. 11, Apr. 1984).

*Primary Examiner*—Raulfe B. Zache
*Assistant Examiner*—Archie E. Williams, Jr.
*Attorney, Agent, or Firm*—Antonelli, Terry & Wands

[57] ABSTRACT

A text inputting device includes a keyboard for inputting a string of characters of a first kind by keying keys and a first device for displaying characters of a second kind corresponding to the character string supplied from the keyboard as candidate characters and selecting a desired character of the second kind from the candidate characters for supplying it to a processor. A second device is also provided for reading a character of the second kind corresponding to a mnemonic code in the character string supplied from the keyboard for supplying it to the processor. In order to determine whether the first or second device is used, a selection switch is provided for selectively activating the first or the second device when a character of the second type is to be inputted. Further, to assist in teaching the mnemonic code, when the first device is selected, either visual or oral correspondence is provided between the selected candidate character and its corresponding mnemonic code. The invention is particularly useful in inputting complex texts such as Japanese or other language texts.

16 Claims, 12 Drawing Figures

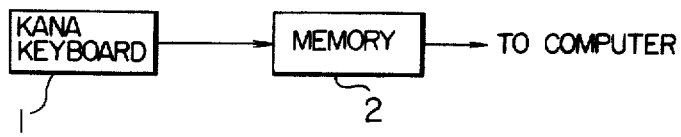
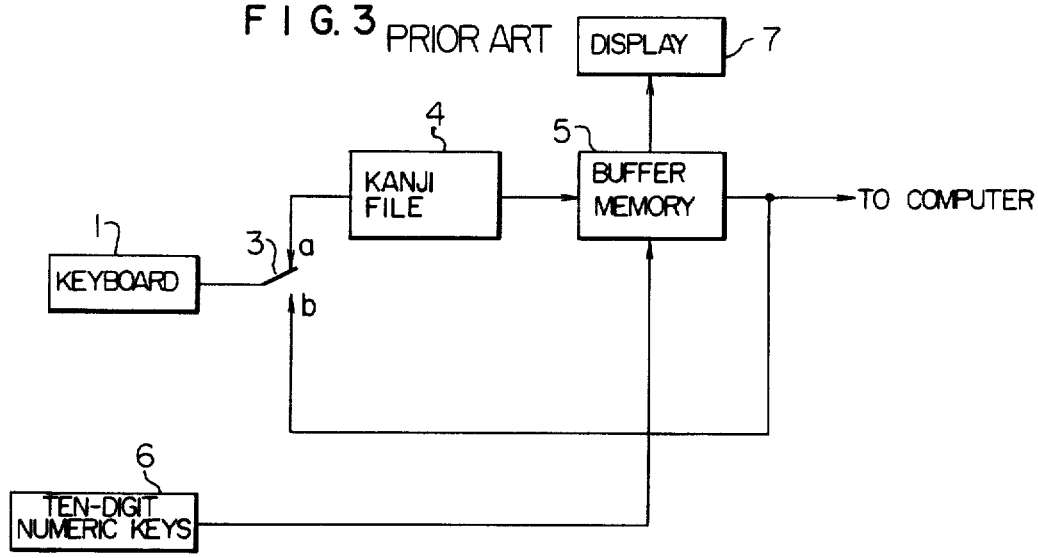

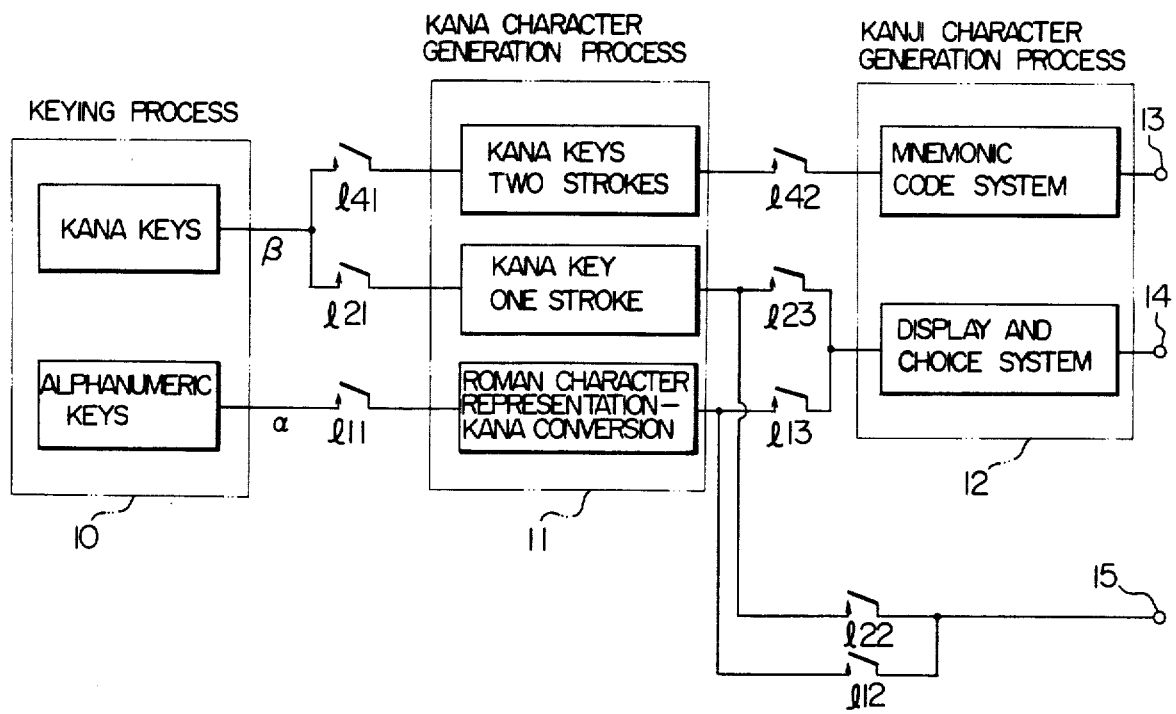

| ハム 公 | ヒロ 広 | コノ 好 |
|---|---|---|
| アラ 抗 | ヘニ 紅 | ノウ 皇 |
| ヒカ 光 | コウ 校 | ヒラ 考 |
|  |  |  |

JAPANESE TEXT INPUTTING SYSTEM HAVING INTERACTIVE MNEMONIC MODE AND DISPLAY CHOICE MODE

BACKGROUND OF THE INVENTION

1. Field of the Invention

The present invention relates to a text inputting device for inputting a text to an information processing system such as a computer.

2. Description of the Prior Art

Heretofore, as input systems for inputting a Japanese text including KANJI characters (Chinese and Japanese ideographs called KANJIs) to an information handling system such as a computer, a full KANJI key set system and a KANA or alphabetic key system have been known.

In the full KANJI key set system, KANJI characters, KANA characters, alphanumeric characters, symbols and a space to be entered (hereinafter aggregatively called input characters) are allocated to keys arranged in a single or multi-plane keyboard and keys corresponding to characters to be entered are depressed to enter a Japanese text.

In this system, input characters are marked or graved on the keys and an operator has to search keys corresponding to the input characters. Since any special or complex manipulation is not necessary to enter the input characters, a variety of operators including beginners and experts can use the system. However, 2,000 to 4,000 KANJI characters must be usually prepared to input the Japanese text and it is time consuming to search a key from such a large number of KANJI keys. Hence, the burden on the operator is substantial. Accordingly, a character input speed in this system is 10 to 20 characters per minute for a beginner and 60 characters per minute for an expert.

On the other hand, in the KANA or alphabetic key system, the number of keys is limited to several tens in order to improve the poor operability and the low character input speed in the full KANJI key system. Usually, a KANA typewriter or an alphabetic typewriter is used in this system.

The KANA or alphabetic key system includes a number of methods. Among others, it includes a mnemonic code system which is a high speed input system designed for an expert and a system of candidates display and choice (hereinafter called display and choice system) for a beginner. Those systems will now be explained.

FIGS. 1 and 2 illustrate the mnemonic code system, in which FIG. 1 shows a basic configuration and FIG. 2 shows an example of a mnemonic code configuration.

Referring to FIG. 1, by depressing a desired key on a KANA keyboard 1, a read address of data stored in a memory 2 is determined. The memory 2 stores KANJI codes in a relation with KANA characters as shown in FIG. 2. The mnemonic code is a combination of plural characters of a first kind, the combination being predetermined uniquely corresponding to each of characters of a second kind. Two KANA character codes are to be inputted to output a KANJI character using the mnemonic code stored in the memory 2. The first KANA character defines a row in a vertical line 1 in FIG. 2 and the second KANA character defines a column in a horizontal line 2 in FIG. 2. For example, when a KANA key "ア" and a KANA key "イ" are depressed, code representing a KANJI character "愛" is read from the memory 2. The KANJI code representing the KANJI character corresponds to an address of a memory of a character generator (not shown) in which the KANJI character "愛" is stored, and a character pattern is read from the character generator based on the code information and displayed on a display (not shown).

In the mnemonic code system, the operator must memorize the character string for the mnemonic code since the KANJI character is read out by two KANA characters code. However, once the operator has fully memorized the character string, an input speed for the KANJI character is one half of that for the KANA character. For example, an operator who can operate a KANA typewriter at a speed of 300 characters per minute can enter the KANJI characters at a speed of 150 characters per minute.

In general, when the Japanese text including the KANA characters and the KANJI characters is to be entered, not only the KANJI characters but also the KANA characters are inputted by two strokes using KANA keys and space key or other keys in order to keep a rhythm in keying operation.

Thus, the mnemonic code system allows a high speed input of the Japanese text for a trained expert operator but it is not suitable to an untrained beginner operator.

FIGS. 3, 4a and 4b illustrate the display and choice system, in which FIG. 3 shows a basic configuration and FIGS. 4a and 4b show a relation between a displayed content and a key arrangement.

Referring to FIG. 3, an output derived by depressing a desired key on a KANA keyboard 1 is switched by a selection switch 3. When a KANA character is to be entered, the switch 3 is thrown to a contact b so that the output from the keyboard 1 is directly supplied through the contact b. On the other hand, when a KANJI character is to be entered, the switch 3 is thrown to a contact a so that the output from the KANA keyboard 1 is supplied to a KANJI file 4 containing a KANJI dictionary, through the contact a. Candidate KANJI characters having ON representation (phonetic representation of KANJI character) or KUN representation (Japanese reading of KANJI character) corresponding to a string of KANA characters from the output of KANA keyboard 1 are read from the KANJI file 4 and stored in a buffer memory 5. The content of the buffer memory 5 is displayed on the display 7. A display format is shown in FIG. 4a. In the illustrated example, in order to input a KANJI character "校", a phonetic representation "コウ" is inputted by depressing two KANA keys on the KANA keyboard 1 and resulting candidate KANJI characters read from the KANJI file 4 into the buffer memory 5 are displayed on the display 7. The operator watches the candidate KANJI characters displayed on the display 7 and chooses the KANJI character "校" from the candidates by depressing one of ten numeric keys 6. As seen from FIGS. 4a and 4b, the display format shown in FIG. 4a corresponds to the arrangement of the ten numeric keys shown in FIG. 4b. Accordingly, by depressing a numeric key "2", the KANJI character "校" is chosen from the candidates and inputted to a computer.

In this display and choice system, the operator has to choose the KANJI character while watching the displayed candidate KANJI characters. Accordingly, it is not possible to enter the characters by blind typing or keying using touch method and the character inputting speed is lower than that of the mnemonic code system. However, it is not necessary to memorize the codes and even a beginner can enter the Japanese text if the apparatus is programmed to enable the readout of the candidate KANJI characters either by ON or KUN representation. If the KANA keyboard 1 is replaced by an alphabetic keyboard so that the KANA characters are inputted by Roman character representation or if the KANA matrix keyboard has an arrangement of KANA keys in which rows and columns correspond to consonants and vowels, respectively, the beginner can readily enter the Japanese text. According to an experiment, when the Roman characters are inputted using the alphabetic keyboard, an operator who can key in alphabetic characters 300 characters per minute could enter the Japanese text including the KANA characters and the KANJI characters at a speed of 50 characters per minute. A non-experienced operator who can type the alphabetic characters only 30 characters per minute could enter the Japanese text at a speed of 10 characters per minute. This speed is substantially equal to that of the full KANJI key set system. However, in the full KANJI key set system, the operator must search a desired character key out of 2000 to 4000 character keys but in the present system the number of the candidate KANJI characters is several to ten and several. Accordingly, the operability is much better and a feeling of fatigue of the operator is less.

As described above, in the mnemonic code system, the expert operator can type in blindly at a high speed but the beginner operator cannot type at a high speed. In addition, considerable training is required before the operator can enter the Japanese text in the mnemonic code system.

In the display and choice system, the beginner operator can readily use the apparatus but the character inputting speed is about one half of that of the mnemonic code system even by the expert operator because the operator cannot key in blindly.

SUMMARY OF THE INVENTION

It is a primary object of the present invention to provide a Japanese text inputting system which enables an expert operator to input a Japanese text at a high speed and a beginner operator to input the Japanese text with a high operability.

It is another object of the present invention to provide a Japanese text inputting system which allows the beginner operator to input the Japanese text at a high speed by providing a learning function.

In order to achieve the above objects, the present invention is characterized by first means for inputting a character string by a keying operation, second and third means for inputting the inputted character string to processors in a display and choice system and a mnemonic code system, respectively, and fourth means for selectively activating the second or third means in response to a desired mode of an operator.

The present invention is, further characterized by displaying the character string for the mnemonic codes corresponding to candidate KANJI characters when the candidate KANJI characters are displayed by the second means in the display and choice system, thereby providing a learning function.

BRIEF DESCRIPTION OF THE DRAWINGS

FIG. 1 shows a basic configuration of a conventional mnemonic code system.

FIG. 2 shows an example of a mnemonic code.

FIG. 3 shows a basic configuration of a conventional display and choice system.

FIGS. 4a and 4b shows a display content and a corresponding arrangement of ten-digit numeric keys.

FIG. 5 shows a functional block diagram for illustrating a principle of a Japanese text inputting device of the present invention.

DESCRIPTION OF THE PREFERRED EMBODIMENTS

Figure 6:
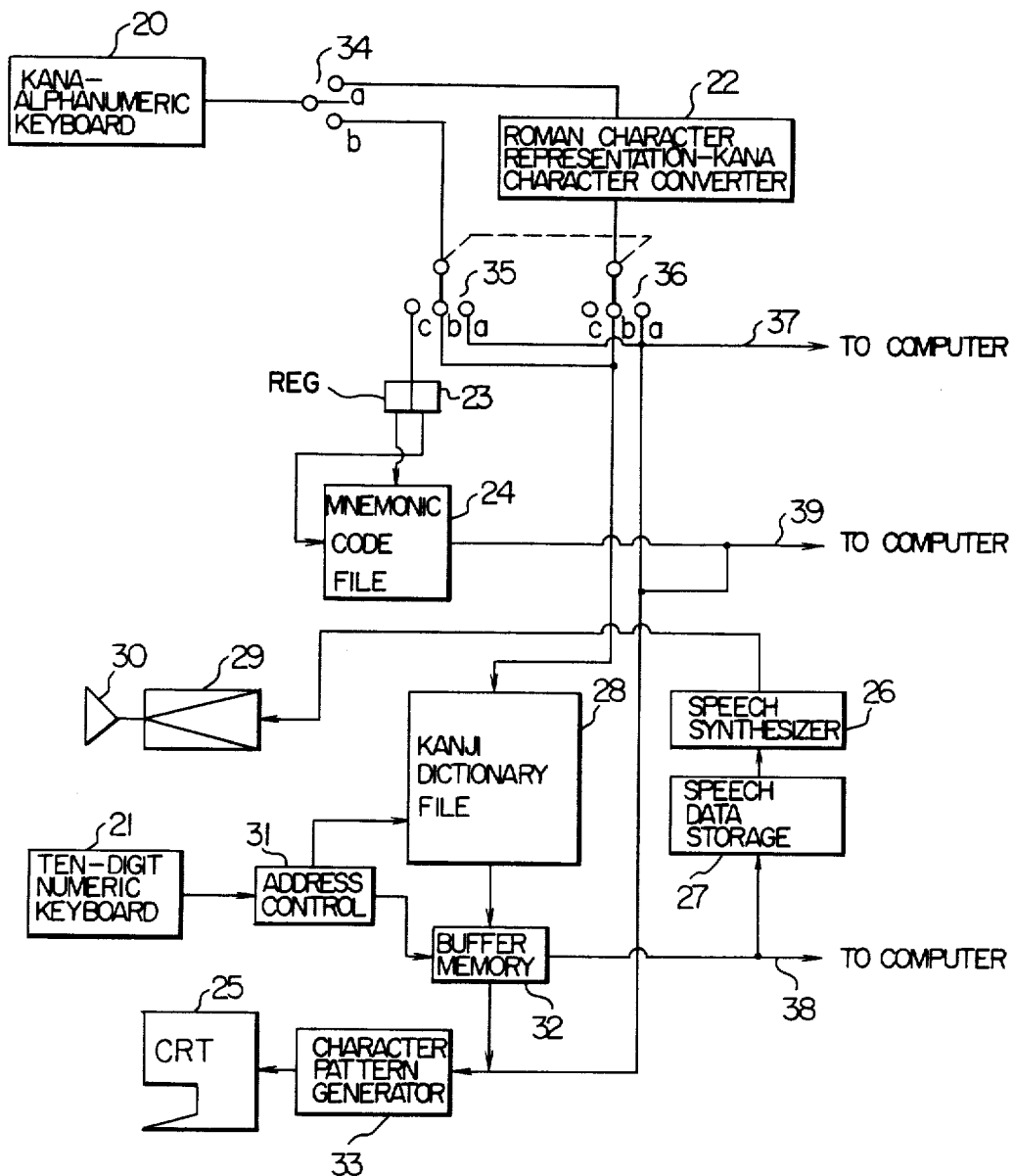
FIG. 6 shows a configuration of an embodiment of the Japanese text inputting device of the present invention.

FIG. 5 shows a functional block diagram for explaining a principle of a Japanese text inputting device in accordance with the present invention, in which a mnemonic code system or a display and choice system is selected as desired.

In FIG. 5, numeral 10 denotes a combined KANA-alphabetic keyboard, numeral 11 denotes a block for generating KANA characters and numeral 12 denotes a block for generating KANJI characters. Symbols $l_{11}$ to $l_{42}$ denote function switches used to input a Japanese text in $L_1$ to $L_4$ modes to be described later.

The present invention is characterized by the ability of inputting the Japanese text in one of the four modes $L_1$–$L_4$ depending on a capability or degree of training of an operator.

In the first mode $L_1$, when a KANA character is to be inputted, the switches $l_{11}$ and $l_{12}$ are closed to render the combined KANA-alphabetic keyboard 10 in an alphabetic mode, and a Roman character representation is inputted by alphanumeric keys to produce an alphanumeric code output $\alpha$, which is then converted to a KANA code and supplied to a computer through a terminal 15. When a KANJI character is to be inputted, the switch $l_{12}$ is opened and the switch $l_{13}$ is closed and ON representation or KUN representation of the KANJI character is inputted by the alphanumeric keys in the form of Roman character representation, and the KANJI character is selected by the candidates display and choice method and the desired KANJI information is supplied to a terminal 14.

In the mode $L_2$, when a KANA character is to be inputted, the switches $l_{21}$ and $l_{22}$ are closed to select a KANA mode, and a KANA key is depressed to produce a KANA code output $\beta$, which is then supplied to the output terminal 15. When a KANJI character is to be inputted, the switch $l_{22}$ is opened and the switch $l_{23}$ is closed, and an ON or KUN representation of the KANJI character is inputted by KANA keys in the form of KANA characters, and the KANJI character is selected by the display and choice system and the selected KANJI information is supplied to the computer through the terminal 14.

In the mode $L_3$, when a KANA character is to be inputted, the switches $l_{21}$ and $l_{22}$ are closed to select the KANA mode and a KANA key is depressed to produce the KANA code output $\beta$, which is then supplied to the computer through the terminal 15. When a KANJI character is to be inputted, if an operator knows a corresponding character string for mnemonic code, the switches l41 and l42 are closed and the code represented by two KANA characters is inputted by keying the KANA keys of the keyboard 10 so that the KANJI character corresponding to the code is read by the mnemonic code system and supplied to the computer through a terminal 13. When a KANJI character a mnemonic code of which has not been learned by the device is to be inputted, the switches l21 and l23 are closed so that the KANJI character is selected by the display and choice system and the selected KANJI information is supplied to the computer through the terminal 14.

In the mode L4, the switches l41 and l42 are closed to input a KANJI character in the mnemonic code system. In this case, a KANA character is also inputted by two strokes of keys in order to keep rhythmical operation in inputting the KANJI character and the KANA character. For example, a KANA character is inputted by keying a KANA key and a space key, or a space key and a KANA key.

FIG. 6 shows a circuit configuration of one embodiment of the Japanese text inputting device of the present invention. Numeral 20 denotes a combined KANA-alphanumeric keyboard, numeral 21 denotes a ten-digit numeric keyboard, numeral 22 denotes a Roman character representation to KANA character conversion circuit, numeral 23 denotes a shift register, numeral 24 denotes a mnemonic code file, numeral 25 denotes a CRT display, numeral 26 denotes a speech synthesizing circuit, numeral 27 denotes a speech data memory, numeral 28 denotes a KANJI character dictionary file, numeral 29 denotes an output amplifier, numeral 30 denotes a loudspeaker, numeral 31 denotes an address control circuit, numeral 32 denotes a buffer memory, numeral 33 denotes a character pattern generator, numeral 34 denotes a Roman character representation mode selection switch, numeral 35 and 36 denote a switch for selecting a KANA code, a KANJI code or a mnemonic code, numeral 37 denotes an output signal line for the KANA code, and numerals 38 and 39 denote output signal lines for the KANJI code.

In the construction thus described, the operation in the mode L1 is first explained.

The Roman character representation selection switch 34 is switched to a contact a. By depressing alphanumeric keys on the keyboard 20 corresponding to a desired Roman character representation, a corresponding alphanumeric code output is supplied to the Roman character representation-KANA character conversion circuit 22, which produces a KANA character code corresponding to the input alphabetic code. The Roman character representation-KANA character conversion circuit 22 may be that disclosed in Japanese patent application Laid-Open No. 50-94837 (1975). When a character to be inputted is a HIRAKANA or KATAKANA character, the ganged switches 35 and 36 are switched to positions a and a HIRAKANA or KATAKANA character code is supplied to the computer through the output signal line 37. The KANA character code is also applied to the character pattern generator 33 and a corresponding KANA character pattern is displayed on the display 25. When a character to be inputted is a KANJI character, the ganged switches 35 and 36 are switched to contacts b and a KANA character code string corresponding to an ON or KUN representation of the KANJI character is supplied to the KANJI dictionary file 28, which can output KANJI characters having the ON or KUN representation corresponding to the input KANA character code string. Thus, the candidate KANJI codes corresponding to the input KANA character code are read from the file 28 and stored in the buffer memory 32. The KANJI character codes stored in the buffer memory 32 are then supplied to the character pattern generator 33 and displayed on the CRT display 25 in the form of character patterns. The character patterns are displayed on the CRT display 25 in a pattern corresponding to the arrangement of the ten numeric keys as shown in FIG. 4a. Since the number of characters displayed is limited to nine as shown in FIG. 4a, a block of nine characters out of the characters stored in the buffer memory 32 which have higher frequency of usage are displayed first, and the next block of nine characters having the next higher frequency of usage are displayed by depressing the "0" numeric key shown in FIG. 4b. When the KANJI character to be inputted is included in the displayed block of characters, a corresponding one of the ten-digit numeric keyboard 21 is depressed.

The output of the ten-digit numeric keyboard 21 is supplied to the address control circuit 31 which may be a decoder to produce an address signal for reading a KANJI character code corresponding to the depressed numeric key out of the character block in the buffer memory 32. The KANJI character code read out by the address signal is supplied to the computer through the output signal line 38. When the "0" numeric key of the ten-digit numeric keyboard 21 is depressed, the address control circuit 31 sends a signal to the KANJI dictionary file 28 so that the KANJI character codes corresponding to the next block of nine KANJI characters are read from the file 28.

On the other hand, the KANJI character code on the output signal line 38 also serves as an address to the speech data storage 27 which stores data representative of the ON representations of sets of two KANA characters of the mnemonic code corresponding to the KANJI characters. The speech data read from the memory 27 is supplied to the speech synthesizing circuit 26, which synthesizes the speech signal, which in turn is supplied to the output amplifier 29 and thence to the speaker 30 to produce a voice output. For example, when the KANJI character code read represents "空", the corresponding mnemonic code " ア ィ " is read from the memory 27 and the speech therefor is produced from the speaker 30.

Accordingly, since the speech corresponding to the mnemonic code for the selected KANJI character is produced from the speaker 30, the operator can learn the character string for the mnemonic code of the inputted KANJI character.

Figures 7, 8:
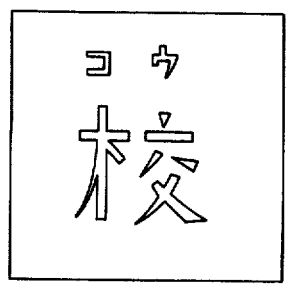
FIGS. 7 and 8 show charts for explaining the operation of the circuit of FIG. 6.

In the present embodiment, the character patterns displayed on the display 25 include not only the KANJI character patterns but also the KANA character patterns corresponding to the mnemonic codes of the KANJI characters as shown in FIG. 7. Thus, when the candidate KANJI characters are displayed on the CRT display 25 in a pattern corresponding to the arrangement of the ten-digit numeric keyboard, the KANA characters corresponding to the mnemonic codes are also displayed as shown in FIG. 8. For example, for the KANJI character "校", the KANA characters " コ ウ ", corresponding to the mnemonic code are also displayed. Thus, by displaying not only the KANJI characters but also the KANA characters corresponding to the mnemonic codes, the operator can learn the character string for the code corresponding to the inputted KANJI character.

Accordingly, in the present embodiment, since the mnemonic codes are outputted both by the synthesized speech and by the CRT display, the operator can learn the mnemonic codes more efficiently.

In the mode $L_2$, the selection switch 34 is switched to the contact b as shown in FIG. 6. When a KANA character is to be inputted, the ganged switches 35 and 36 are switched to the contacts a and the KANA key on the keyboard 20 is depressed so that the KANA character code output is supplied to the computer through the output signal line 37.

On the other hand, when a KANJI character is to be inputted, the ganged switches 35 and 36 are switched to the contacts b and the KANA keys on the keyboard 20 are depressed and the output is supplied to the KANJI dictionary file 28. The subsequent operation is same as that in the mode $L_1$ and hence it is not explained here.

In the mode $L_4$, the selection switch 34 is switched to the contact b and the ganged switches 35 and 36 are switched to the contacts c. As a result, the KANA character code outputs derived by depressing the KANA keys of the keyboard 20 including the KANA keys, space key and symbol keys are transferred to the shift register 23. The KANJI character, KANA character or symbol is defined by depressing two KANA keys of the keyboard 20. A code at a first stroke of the KANA key is loaded to a right stage of the shift register 23 and a code at a second stroke is loaded to a left stage of the shift register 23, and a content of the mnemonic code file 24 is read in accordance with the loaded information. More specifically, the data in the file 24 are arranged as shown in FIG. 2 so that the information at the first stroke of the KANA key defines a row and the information at the second stroke defines a column. When the row and the column are defined by the information, data of the character code in the file 24 (including KANJI characters, HIRAKANA characters, KATAKANA characters, symbols and space) at the crosspoint of the row and the column is read out. Accordingly, each time when two KANA keys are depressed, one character of character code is read from the mnemonic code file 24 and supplied to the computer through the output signal line 39.

In the mode $L_3$, the selection switch 34 is switched to the contact b and the ganged switches 35 and 36 are selectively switched to the contacts a, b or c.

When a KANA character is to be inputted, the ganged switches 35 and 36 are switched to the contacts a and the KANA character is inputted at one stroke by the KANA key on the keyboard 20. When a KANJI character is to be inputted, if the operator does not memorize the character string for the code corresponding to the KANJI character, or if a KANJI character not defined by the mnemonic code is to be inputted, the ganged switches 35 and 36 are switched to the contacts b and the KANA character codes are supplied to the KANJI dictionary file 28 so that the KANJI character is inputted in the display and choice system as is done in the modes $L_1$ and $L_2$.

When a KANJI character is to be inputted and the operator knows the corresponding character string for mnemonic code, the ganged switches 35 and 36 are switched to the contacts c and the KANA character codes from the keyboard 20 are supplied to the shift register 23, and the KANJI code is read from the mnemonic code file 24 and supplied to the computer.

Accordingly, the levels of the operators who operate in the modes $L_1$ to $L_4$ are classified as follows:

(1) Mode $L_1$: Non-expert who can only type an alphabetic typewriter.
(2) Mode $L_2$: Non-expert who can type a KANA typewriter at a low speed but does not know the character string for mnemonic codes.
(3) Mode $L_3$: Semi-expert who can type a KANA typewriter but knows the character string for the mnemonic codes for only the frequently used KANJI characters.
(4) Mode $L_4$: Expert who can type a KANA typewriter at a high speed and fully memorizes the character string for the mnemonic codes.

Accordingly, by appropriately selecting one of the modes $L_1$ to $L_4$, a variety of operators ranging from the non-expert who can type only the alphabetic typewriter to the expert who memorizes the mnemonic codes can input a Japanese text in a mode compatible to their own skills.

By appropriately selecting the modes, the Japanese text can be inputted not only in a manner compatible to the skill of the operator but also in a very flexible manner. While the number of KANJI characters which can be inputted in the mnemonic code system is restricted by the number of KANA keys, no such restriction is imposed on the display and choice system. Accordingly, by inputting the KANJI characters having a high frequency of usage in the mnemonic code system and inputting the KANJI characters not covered by the mnemonic code system in the display and choice system, a very flexible inputting system is provided.

In the present invention, since the KANA characters for the mnemonic codes corresponding to the displayed KANJI characters are produced by the synthesized speech and displayed on the CRT display, the operator can learn the character string for themneomonic codes both through an auditory sense and through a visual sense each time when the operator inputs the KANJI character in the display and choice system. Accordingly, the operator can naturally memorize the character string for the mnemonic codes of the frequently used KANJI characters. The learning of the character string for mnemonic codes is usually hard work to do, but in accordance with the present invention, the operator can naturally memorize the stored character string for the codes while the operator inputs the Japanese text in the display and choice system. Accordingly, the present invention is of high practical value.

In the illustrated embodiment, the character string for the mnemonic codes of the KANJI characters displayed are both displayed on the display 25 and produced from the loudspeaker 30 as the synthesized speech, but either the display or the speech may be omitted.

The ten-digit numeric keyboard 21 may be substituted by the KANA or alphanumeric keys on the keyboard 20.

The displayed KANJI character pattern is not limited to the ten-digit numeric arrangement shown in FIG. 4a but many other arrangements may be used.

In the mnemonic code system in the mode $L_4$ described above, the KANJI, KANA and symbol codes are generated by the combinations of two KANA character codes. Alternatively, the combinations of three or more KANA character codes or the combinations of two or more alphanumeric codes may be used.

Figure 9:
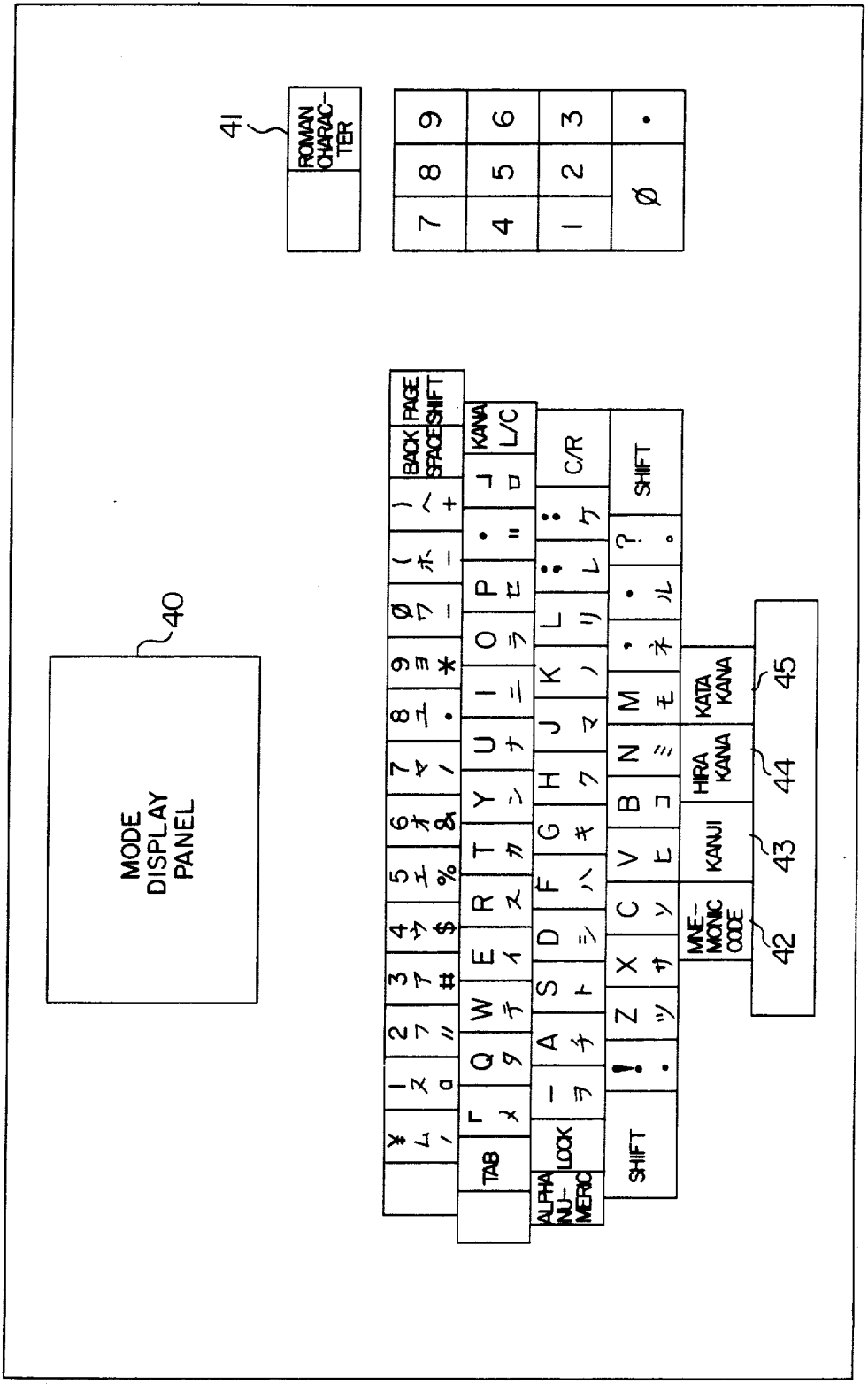
FIG. 9 shows an arrangement of an operation and display panel used in the present invention.

FIG. 9 shows a configuration of an operation and display panel including the combined KANA-alphabetic keyboard 20 and the ten-digit numeric keyboard 21. Numeral 40 denotes a mode display panel, numeral 41 denotes a Roman character representation selection key, numeral 42 denotes a mnemonic code system selection key, numeral 43 denotes a KANJI character selection key, numeral 44 denotes a HIRAKANA character selection key, and numeral 45 denotes a KATAKANA character selection key. The key 41 corresponds to the switch 34 shown in FIG. 6, the key 42 corresponds to the contacts c of the switches 35 and 36 of FIG. 6, the key 43 corresponds to the contacts b of the switches 35 and 36, and the key 45 corresponds to the contacts a of the switches 35 and 36.

Figure 10:
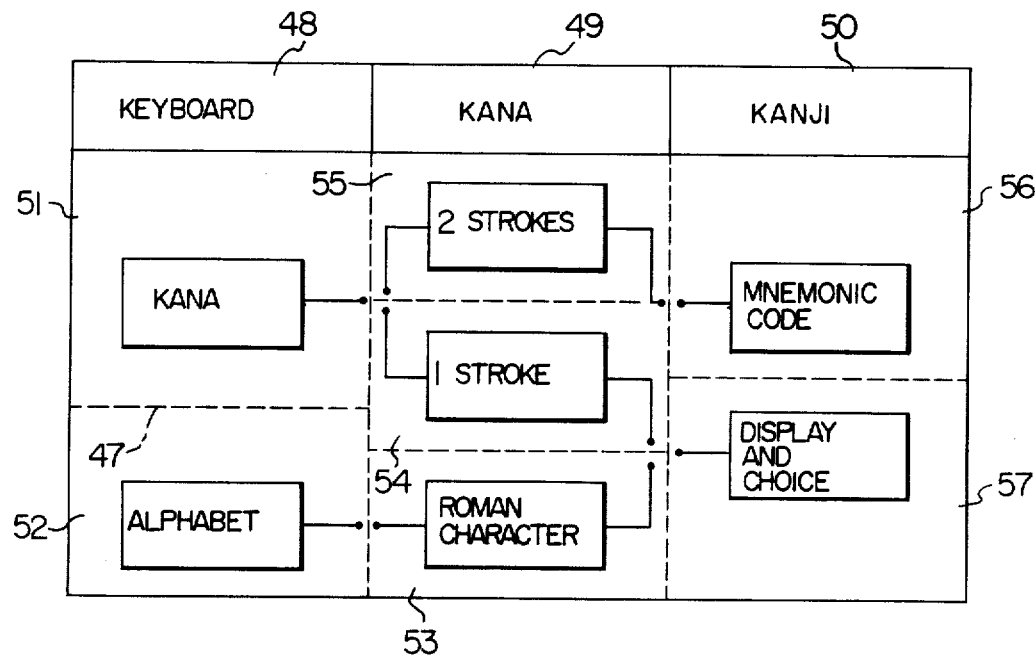
FIGS. 10 and 11 shows a top view and a circuit configuration of the display panel of FIG. 9.
Figure 11:
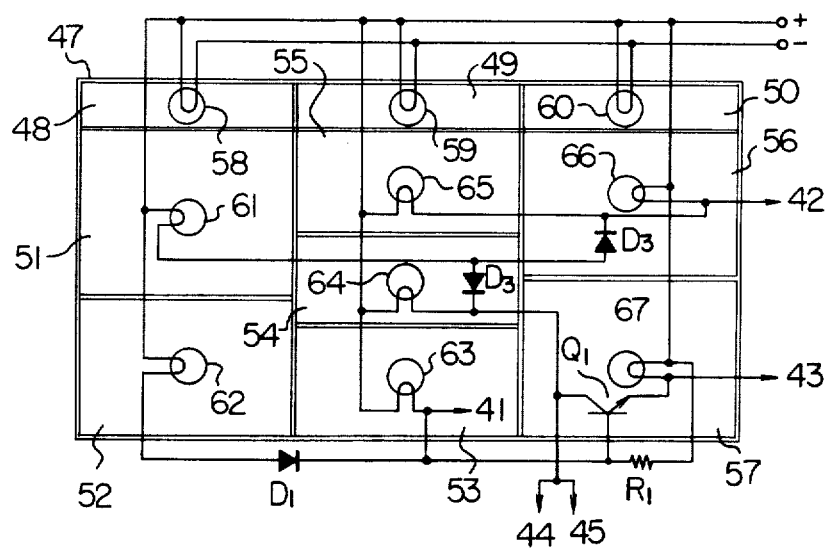

FIG. 10 shows a front view of the mode display panel 40 and FIG. 11 shows a circuit configuration thereof. The interior of the display panel 40 has sections 48 to 57 partitioned by walls 47 and lamps 58 to 67 are arranged in the respective sections. A front surface of the display panel is covered with a translucent plate on which characters and patterns as shown in FIG. 10 are printed or graved.

Referring to FIG. 11, $Q_1$ denotes a transistor, $D_1$ to $D_3$ denote diodes, and $R_1$ denotes a resistor.

When the Roman character representation key 41 is depressed, the lamps 62 and 63 are lit to illuminate the sections 52 and 53 to indicate that the Roman character representation is being inputted by the alphanumeric keys. When the HIRAKANA selection key 44 or the KATAKANA selection key 45 is depressed, the lamp 61 or 64 is lit to illuminate the section 51 or 54 to indicate that the HIRAKANA or KATAKANA character is being inputted.

When the KANJI selection key 43 is depressed, the lamp 67 is lit to illuminate the section 57. If the Roman character representation key 41 is simultaneously depressed, a base potential of the transistor $Q_1$ is at the same level as an emitter potential thereof and hence the transistor $Q_1$ is cut off. Accordingly, the lamps 61 and 64 are not lit and the sections 51 and 54 are not illuminated. On the other hand, when the Roman character selection key 41 is not depressed, the transistor $Q_1$ conducts so that the lamps 64 and 61 are lit to illuminate the sections 54 and 51 to indicate that the KANA characters representing the ON or KUN representation is being inputted by the KANA keys and the KANJI character is selected by the display and choice system.

When the mnemonic code system selection key 42 is depressed, the lamps 61, 65 and 66 are lit to illuminate the sections 51, 55 and 56 to indicate the mnemonic code system with two strokes of KANA keys.

In this manner, the current input mode can be identified by depressing a desired key so that the operators ranging from the beginner to the expert can input the Japanese text in an inputting procedure suitable to their skills without confusion in spite of a high degree of freedom in the selection of the input modes.

As described hereinabove, in accordance with the present invention, a Japanese text inputting device which allows an expert operator to input the Japanese text at a high speed and a beginner operator to input the Japanese text with a high operability and which has a learning function is provided.

We claim:

1. A text inputting device for inputting text to an information processing system comprising:
   (a) first means for inputting a string of characters of a first kind which designates a character of a second kind to be inputted to the information processing system in order to generate codes for the inputted string;
   (b) second means for generating in a first mode a code of the character of the second kind, including display means responsive to the codes from said first means for displaying candidate characters of the second kind which have a phonetic relationship to the text designated by the character string of the first kind, and operator-operable selection means for selecting one of the displayed candidate characters of the second kind to provide a code for said selected character of the second kind to said information processing system;
   (c) third means for generating in a second mode a code of a character of the second kind corresponding to the character string from said first means, wherein the character string is uniquely and predeterminedly assigned to the character of the second kind as a mnemonic code to provide the generated code of the character of the second kind to said information processing system;
   (d) fourth means for selecting either said first or second mode by alternatively connecting either said second or said third means to said first means, said fourth means being operated by the operator; and
   (e) fifth means cooperatively coupled to said second means for representing to the operator the mnemonic code of the character of the second kind selected by said operator-operable means to the operator,
   wherein in inputting a text to said information processing system, when a character of the second kind of which the mnemonic code is not known by the operator appears in the text, said fourth means is activated to enable said second means to operate in said first mode,
   and when a character of the second kind of which the mnemonic code is known by the operator appears in the text, said fourth means is selectively activated to enable said third means to operate in said second mode.

2. A text inputting device for inputting text to an information processing system comprising:
   (a) first means for inputting a string of characters of a first kind which designates a character of a second kind to be inputted to the information processing system in order to generate codes for the inputted string;
   (b) second means for generating in a first mode a code of the character of the second kind, including display means responsive to the codes from said first means for displaying candidate characters of the second kind which have a phonetic relationship to the text designated by the character string of the first kind, and operator-operable selection means for selecting one of the displayed candidate characters of the second kind to provide a code for said selected character of the second kind to said information processing system;
   (c) third means for generating in a second mode a code of a character of the second kind corresponding to the character string from said first means, wherein the character string is uniquely and predeterminedly assigned to the character of the second kind as a mnemonic code to provide the generated code of the character of the second kind to said information processing system;

(d) fourth means for selectively indicating one of said first and second modes, said first and second modes respectively being indicated to said second or said third means, said fourth means being operable by the operator so as to enable the operator to indicate the first mode when a mnemonic code for a character of the second kind to be inputted is not known to him and so as to enable the operator to indicate the second mode when the mnemonic code is known to him;

(e) fifth means cooperatively coupled to said second means for representing to the operator the mnemonic code of the character of the second kind selected by said operator-operable means to the operator.

3. A text inputting device according to claim 2, wherein said information processing system receives, as a sequence of codes representing the inputted text, a sequence of codes of characters of the second kind partly generated by said second means when said fourth means indicates said first mode and partly genarated by said third means when said fourth means indicates said second mode.

4. A text inputting device according to claims 1 or 2 wherein said first means includes a combined KANA and alphabetic keyboard and means for selectively inputting KANA characters or alphabetic characters as said characters of said first kind.

5. A text inputting device according to claim 1 wherein said third means includes register means for storing the mnemonic code in the character string supplied from said first means, and memory means which stores KANJI characters as said characters of the second kind corresponding to the mnemonic code and from which the corresponding KANJI character is read in accordance with an output of said register means.

6. A text inputting device according to claims 1 or 4 wherein said first means includes a display panel for displaying the activation status of said second or third means by said fourth means.

7. A text inputting device according to claims 1 or 2 wherein said display means includes memory means which stores codes of characters of the second kind, and control means for reading out codes of the candidate characters of the second kind from the memory means, to display the candidate characters on said display means.

8. A text inputting device according to claims 1 or 2 wherein said fifth means comprises means for controlling said display means to display mnemonic codes which correspond with each of the candidate characters of the second kind during the display of said candidate characters prior to selection of one of said displayed candidate characters of the second kind by said operator-operable selection means.

9. A text inputting device according to claims 1 or 2 wherein said fifth means comprises means for producing speech outputs designating the mnemonic characters of the candidate character of the second kind selected by the operator-operable selection means.

10. A text inputting device according to claims 1 or 2 wherein said string of characters of said first kind is comprised of KATAKANA characters, and said characters of said second kind are KANJI characters.

11. A text inputting device according to claims 1 or 2 wherein said string of characters of said first kind is comprised of HIRAKANA characters, and said characters of said second kind are KANJI characters.

12. A text inputting device according to claims 1 or 2 wherein said string of characters of said first kind is comprised of Roman alphabet characters, and said characters of said second kind are KANJI characters.

13. A text inputting device according to claim 4 wherein said third means includes register means for storing the mnemonic code in the character string supplied from said first means, and memory means which stores KANJI characters as said characters of the second kind corresponding to the mnemonic code and from which the corresponding KANJI character is read in accordance with an output of said register means.

14. A text inputting device according to claim 4 wherein said display means includes memory means which stores cbdes of characters of the second kind, and control means for reading out codes of the candidate characters of the second kind from the memory means, to display the candidate characters on said display means.

15. A text inputting device according to claim 4 wherein said fifth means comprises means for controlling said display means to display mnemonic codes which correspond with each of the candidate characters of the second kind during the display of said candidate characters prior to selection of one of said displayed candidate characters of the second kind by said operator-operable selection means.

16. A text inputting device according to claim 4 wherein said fifth means comprises means for producing speech outputs designating the mnemonic characters of the candidate character of the second kind selected by the operator-operable selection means.

* * * * *